US008191275B2

(12) United States Patent
Whitcomb

(10) Patent No.: US 8,191,275 B2
(45) Date of Patent: Jun. 5, 2012

(54) ADJUSTABLE SQUARE DEVICE

(75) Inventor: G Matthew Whitcomb, Elmdale, KS (US)

(73) Assignee: Whitcomb Machine, LLC, Elmdale, KS (US)

( * ) Notice: Subject to any disclaimer, the term of this patent is extended or adjusted under 35 U.S.C. 154(b) by 474 days.

(21) Appl. No.: 12/545,219

(22) Filed: Aug. 21, 2009

(65) Prior Publication Data

US 2010/0050451 A1 Mar. 4, 2010

(51) Int. Cl.
*G01B 3/00* (2006.01)

(52) U.S. Cl. ............................................ 33/535; 33/42

(58) Field of Classification Search .................... 33/535, 33/41.1, 42, 452, 464
See application file for complete search history.

(56) References Cited

U.S. PATENT DOCUMENTS

| | | | | |
|---|---|---|---|---|
| 147,044 A * | 2/1874 | Church | ........................... | 33/464 |
| 171,927 A * | 1/1876 | Leach | ............................... | 33/42 |
| 4,809,439 A * | 3/1989 | Burns | ............................... | 33/42 |
| 4,903,411 A * | 2/1990 | McArdle | ......................... | 33/430 |
| 5,083,375 A * | 1/1992 | Helm, Sr. | ........................ | 30/294 |
| 6,769,190 B2 * | 8/2004 | Carlisle | ........................... | 33/427 |

* cited by examiner

*Primary Examiner* — G. Bradley Bennett
*Assistant Examiner* — Tania Courson
(74) *Attorney, Agent, or Firm* — David E Herron, II

(57) ABSTRACT

The disclosure depicts an adjustable square device with a body having a substantially uniform cross-section at planes orthogonal to a longitudinal axis, the cross-section having a generally rectangular outline. A first groove extends inwardly from a first end of the body and oriented generally parallel a bottom surface of the body. A second groove extends inwardly from the first end and is orthogonal the first groove, the first and second grooves intersecting at a vertex. The device also has a tunnel extending from the vertex to a second end of the body, and a blade slidably engagable into one of the first or second grooves.

17 Claims, 7 Drawing Sheets

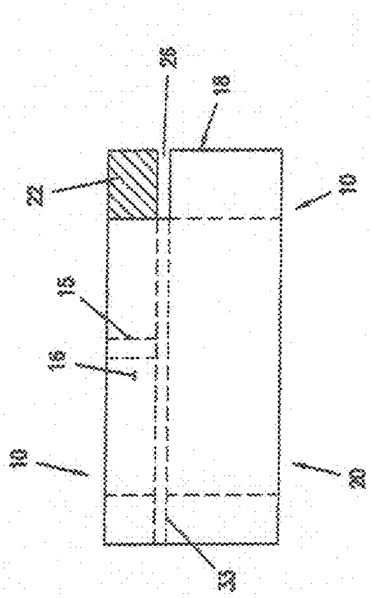
Figure 2B
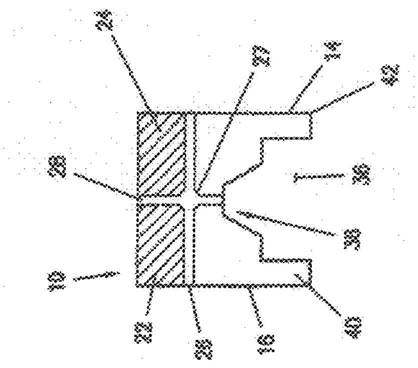
FIGURE 4 (END)
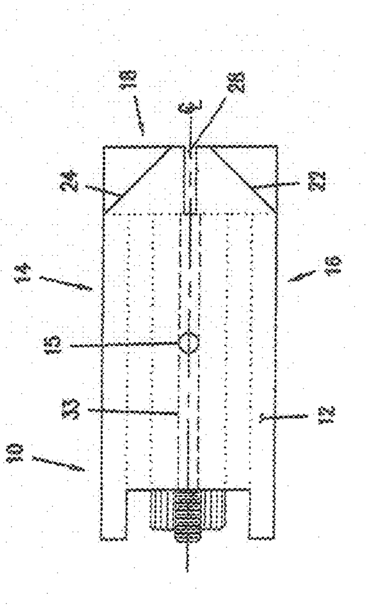
Figure 2A
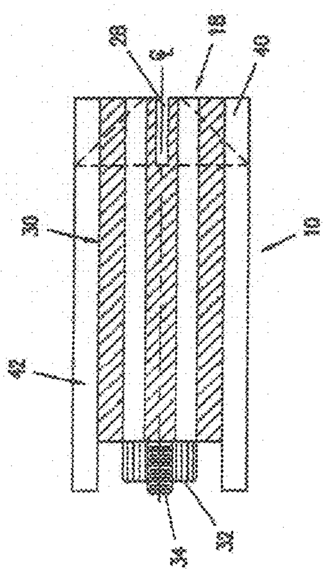
FIGURE 3 (BOTTOM)

ADJUSTABLE SQUARE DEVICE

BACKGROUND OF THE INVENTION

The invention is an improvement on the conventional square, which has a centered blade position and common leg lengths of approximately a half-inch. The conventional square however, is not well-suited for odd-shaped, large-radius, or round-shaped surfaces, as the traditional square cannot reach over or within depths and still provide an accurate, reliable squared line or reference.

The invention improves upon the traditional square by enabling one to reach greater distances into materials and assemblies by having a greater-proportioned reach from the blade.

SUMMARY OF THE INVENTION

My invention is an adjustable square device having a body with a substantially uniform and rectangular cross-section at planes orthogonal to a longitudinal axis. A first groove extends inwardly from the first end of the body such that it is generally parallel to the bottom surface of the body. Similarly, a second groove extends inwardly from the first end. The second groove is perpendicular the first groove, and intersects it at a vertex. A blade is insertable into (and within) either of the grooves.

The square device also has a tunnel extending from the vertex to a second end of the body. The invention will also have a retaining stem positioned within the tunnel such that an initial end extends outside the body and a terminal end passes through the vertex to engage and retain the blade in a selected position. A rectangular void is formed along the bottom surface of the body. The top surface and each of the side walls (along the longitudinal axis), however, are generally planar.

Preferably, the generally rectangular outline of the body is square-shaped. In another preferred embodiment, the inventive square device will have a trapezoidal furrow that extends inwardly from the rectangular void. In this embodiment, the furrow and the void may be each symmetric about the second groove (or a plane passing through it).

Additionally, a channel may be formed on the blade and the retaining stem may bear a protuberance adjacent its terminal end. In this embodiment, the protuberance is formed to engage within the channel when the blade is positioned within one of the first or second grooves. Moreover, the retaining stem may be threaded so that a nut can engage the threading; in this embodiment, the blade is securable to the body by tightening the nut on the retaining stem.

The first end of the body may also have cut-out portions that are angled with respect to the second groove. Preferably, the angled portions are offset at a forty-five degree angle with respect to a plane passing through the second groove. Preferably, the first and second angled portions are symmetric about the second groove as well.

The foregoing summary gives background of the invention so that its best mode of use can be generally understood. The specific details of the invention, however, will be better understood when described in conjunction with the following drawings.

BRIEF DESCRIPTION OF THE DRAWINGS

FIG. 2A is an overhead, plan view of the adjustable square device, accoding to the principles of the invention.

FIG. 2B is a side view of the adjustable square device.

FIG. 3 showed a bottom view of the adjustable square device.

FIG. 4 shows an end view of the adjustable square device.

DETAILED DESCRIPTION OF THE PREFERRED EMBODIMENTS

Figure 1B:
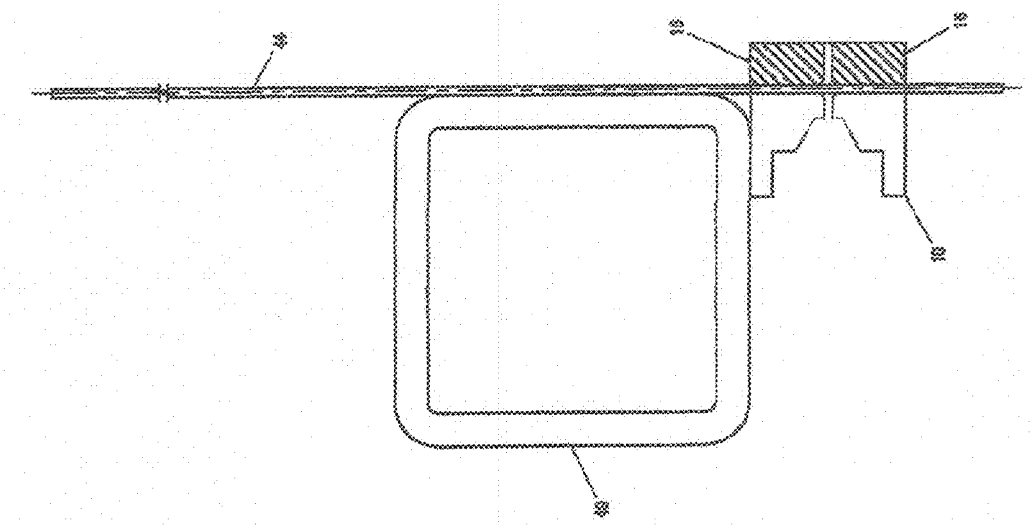
FIGS. 1A and 1B are comparative views showing end views of the prior art square device and the inventive adjustable square device, respectively.
Figure 1A:
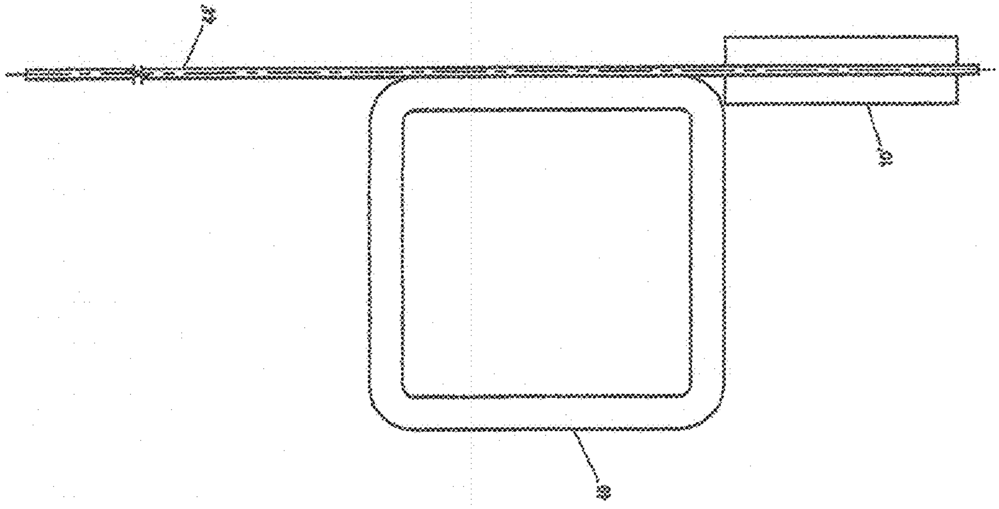

FIG. 1A is an end view showing a typical prior art square device 10' in combination with a workpiece 49. The device 10' included a body (of a generally rectangular cross-section) and a blade 44' passing through a groove in the body. The device 10' of the prior art encountered problems when used with odd-shaped pieces such as workpiece 49, and especially with rounded corners or round pipes because the short end of its rectangular cross-section did not reach from the blade 44'.

FIG. 1B is an end view of the inventive device 10 in combination with the same workpiece 49. The device 10 has sides 16 that extend outwardly from the blade 44, thereby enabling a greater engagement surface with the workpiece 49. The configuration of the device 10 is well-suited to handle odd-shaped or rounded surfaces because it allows the user a deeper reach. While the device 10 shown has a deep reach in a single direction, the deep reach could be symmetric about the blade 44 as well. To wit, the device 10 shows that the bottom of the device is more distal the blade groove than the top of the device 10. Although this embodiment is not shown, the body of the device may have a rectangular (not square) cross-section wherein the blade groove is equidistant the top and bottom ends, or even a configuration wherein the blade groove is closer to the bottom than the top.

FIG. 2A is an overhead, plan view of the top of the adjustable square device 10. The device 10 comprises a top 12, a right side 14, a left side 16, and a first end 18. The device 10 will bear a generally uniform cross section taken at plans perpendicular to its longitudinal axis L.

Still referring to FIG. 2A, a second groove 28 extends inwardly from first end 18 along the longitudinal axis L. The second groove 28 is formed to receive and engage a blade (as shown hereinafter) insertable into the adjustable square device 10. A stem 34 passes through a tunnel 33 formed within the body of the device from its first end 18 and extends outwardly from its second end to engage a nut 32; conversely, the stem 34 is formed to engage the blade (shown aft) at its first end. A cavity 15 is formed in the top 12 surface and concludes at the tunnel 33; while the opening of the cavity is formed on the top surface 12, its configuration and function are better understood with regard to the side view.

FIG. 2B shows a side view of the adjustable square device 10. The device 10 will include a bottom 20 and a planar side 16. First groove 26 extends inwardly from the first end 18 of the device 10, and is parallel to the bottom 20 of the device 10. The cut out portion 22 of the first end 18 is angled with respect to side 16. As with the second groove 28 (shown in FIG. 1), the first groove 26 is formed to receive a blade (shown aft) that may slidingly engage with in the first groove 26.

Referring still to FIG. 2B, the cavity 15 is formed to receive a means for retaining the stem 34 within the tunnel when the blade is not removed from the device 10. The means may include a spring and plunger, or a biased ball that is formed to fit within the cavity 15 and engage the stem 34 and keep it within the tunnel when the blade is removed or being replaced.

FIG. 3 shows a bottom view of the device 10. The bottom 30 of the device will include coplanar bottom surfaces 40, 42. Preferably, the bottom is formed to be generally symmetric about planes through the second groove 28, which extends inwardly from the first end 18 of the device 10, from the top 12 to the bottom 30. (see also FIG. 1)

FIG. 4 shows a detailed end view of the device 10, as viewed from first end 18. The first end 18 will include a first groove 26 extending inwardly with a generally horizontal direction. Conversely, a second groove 28 extends inwardly from with in a general vertical direction, intersecting first groove 26 at a vertex 27. In a preferred embodiment, the first groove 26 is perpendicular the second groove 28 such that first groove 26 is parallel the bottom and top surfaces of the device 10, and second groove 28 is parallel the sides 14, 16 of the device 10.

Still referring to FIG. 4, the device will have a void 36 carved from its bottom. Preferably, the void 36 is rectangular shaped, and extends the length of the device. Additionally, a trapezoidal furrow 38 extends inwardly from the rectangular void 36. Preferably, the void 36 and furrow 38 are formed symmetric about a plane through second groove 28.

Still referring to FIG. 4, the first end 18 will bear angled portions 22, 24 cut away from the first end 18 and disposed at an angle with respect to longitudinal axis L (see FIGS. 1, 3). Preferably, the angled portions 22, 24 are disposed at 45 degree angle with respect to longitudinal axis L.

Still referring to FIG. 4, a tunnel passes through the entire length of the device 10 and terminates at vertex 27.

Figure 5B:
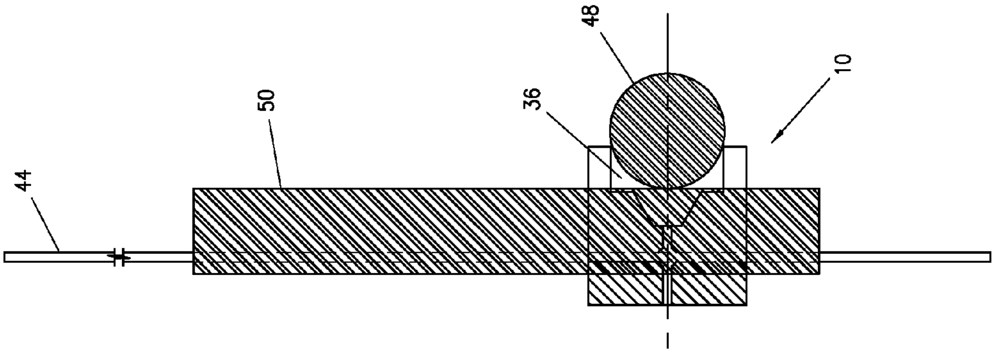
FIGS. 5A and 5B are comparative views showing the adjustable square device in use, with a blade in a first selected orientation.
Figure 5A:
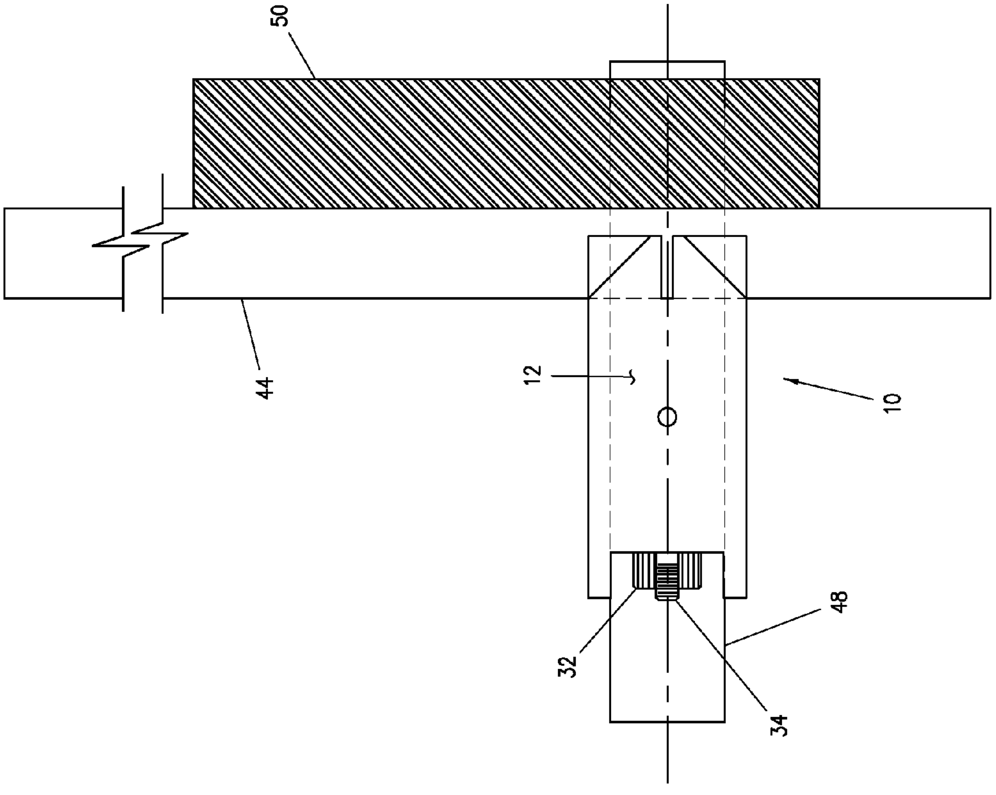

FIG. 5A shows the adjustable square device 10 in combination with a blade 44 engaging within first groove 26 (see FIG. 4). In this embodiment, the device 10 in use to ascertain a square relationship between a round bar 48 and flat piece 50 the unique configuration of the device 10 enables one to set the device 10 atop a round bar 48 and bring the blade 44 into contact the piece 50, thereby ascertaining and assuring a right-angle relationship between round bar 48 and the piece 50.

As shown, the device 10 engages the round bar 48 such that at least a portion of the round bar 48 enters the rectangular void 36 and the blade 44 (inserted into first groove 26) engages the flat piece 50. The rectangular void 36 formed in the bottom of device 10 allows one to more deeply and securely engage round bar 48 so that a more accurate square relationship can be ascertained between round bar 48 and flat stock 50. Once a stable and square relation is established, the parts 48, 50 can be clamped or welded together.

Figure 6B:
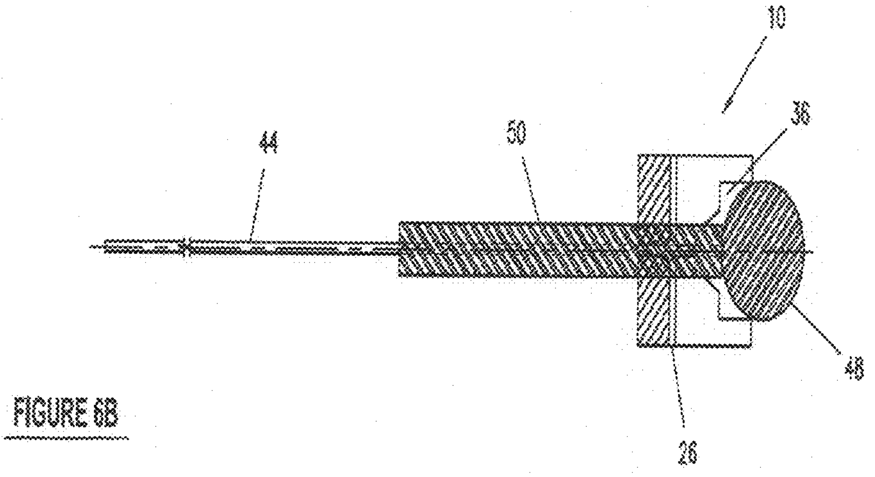
FIGS. 6A and 6B are comparative views showing the adjustable square device, with the blade in a second preferred position.
Figure 6A:
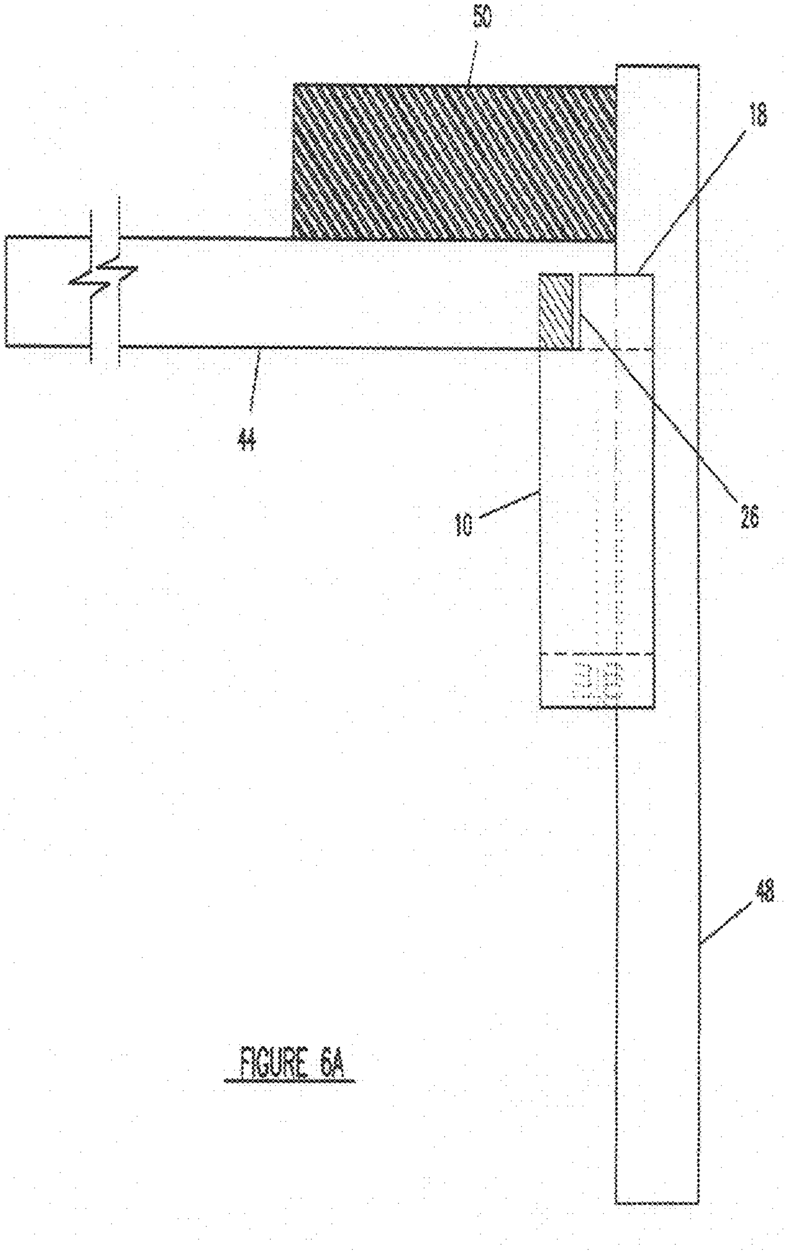

FIGS. 6A and 6B showed comparative views of the adjustable square device 10 are in use with a round bar 48 and flat piece 50. In contrast to FIGS. 5A and 5B, FIGS. 6A and 6B show a blade 44 is oriented generally perpendicular the longitudinal axis of the device 10. As shown in FIG. 6A, the device 10, engages a round bar 48, and brought into contact with a flat portion 50. However, as shown in FIG. 6A, note that first groove 26 is empty, but blade 44 engages the first end 18 of the device 10 in a perpendicular orientation.

Referring to FIG. 6B, the device 10 engages round bar 48 by allowing a portion of the bar 48 to enter the rectangular void 36 formed along the bottom 30 of the device 10. The blade 44 engages within a second groove 28 (see. FIGS. 1, 4), such that the blade 44 engages flat piece 50. One may ascertain a square relation between round bar 48 and flat piece 50 by tightly engaging the device 10 with round bar 48, and the blade 44 with flat surface 50.

Figure 7B:
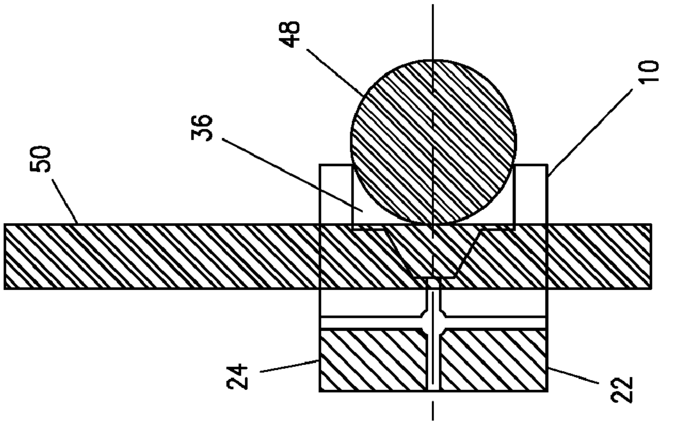
FIGS. 7A and 7B are comparative views showing the adjustable squared device in use, shown without the use of a blade.
Figure 7A:
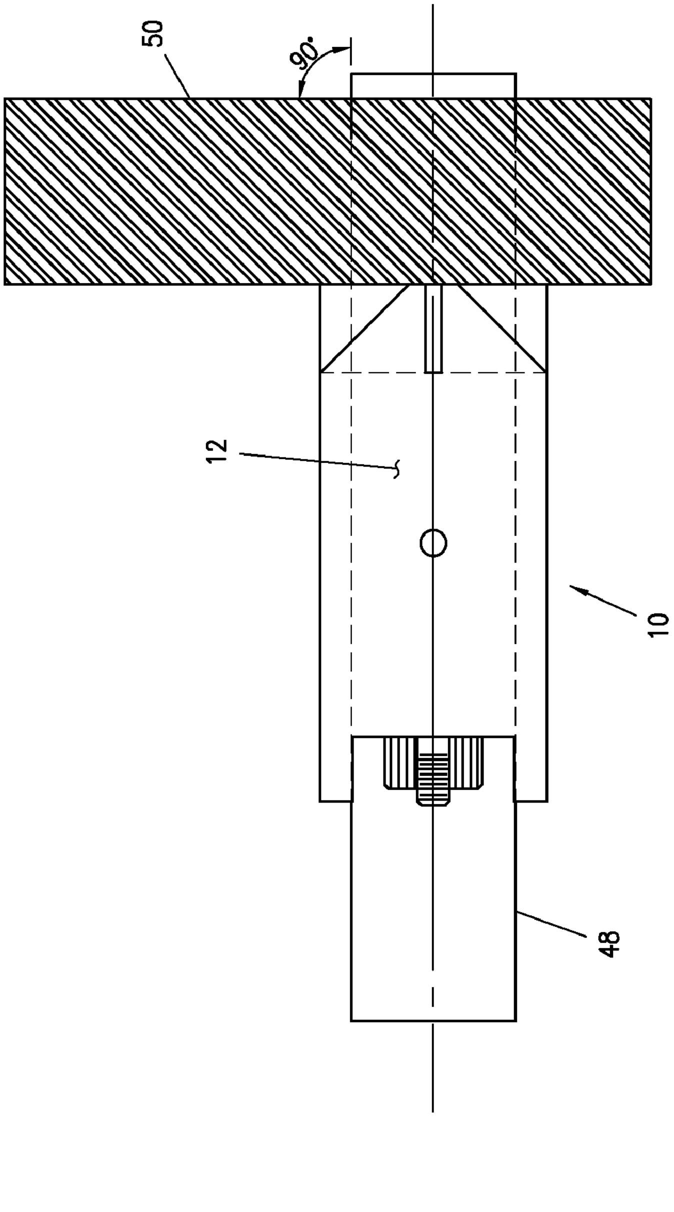

FIGS. 7A and 7B show comparative views of yet another use for the inventive square device.

In FIG. 7A, the device 10 is shown in use with a round bar 48 and flat bar 50 in this embodiment, the device 10 works well to establish a square relation between round bar 48 and flat bar 50 without the requirement of a blade 44 (see FIGS. 5A, 6A). Specifically referring to FIG. 7B, the device 10 engages both round bar 48 and the flat surface 50 by positioning the rectangular void 36 of the device 10 into contact with the round bar 48. Next, the flat bar 50 is brought into contact with the first end 18 of the device. When the flat bar 50 is brought flush into contact with the planar surface of the first end 18 of the device, a square relation between round bar 48 and flat surface 50 is ascertained.

Figure 8:
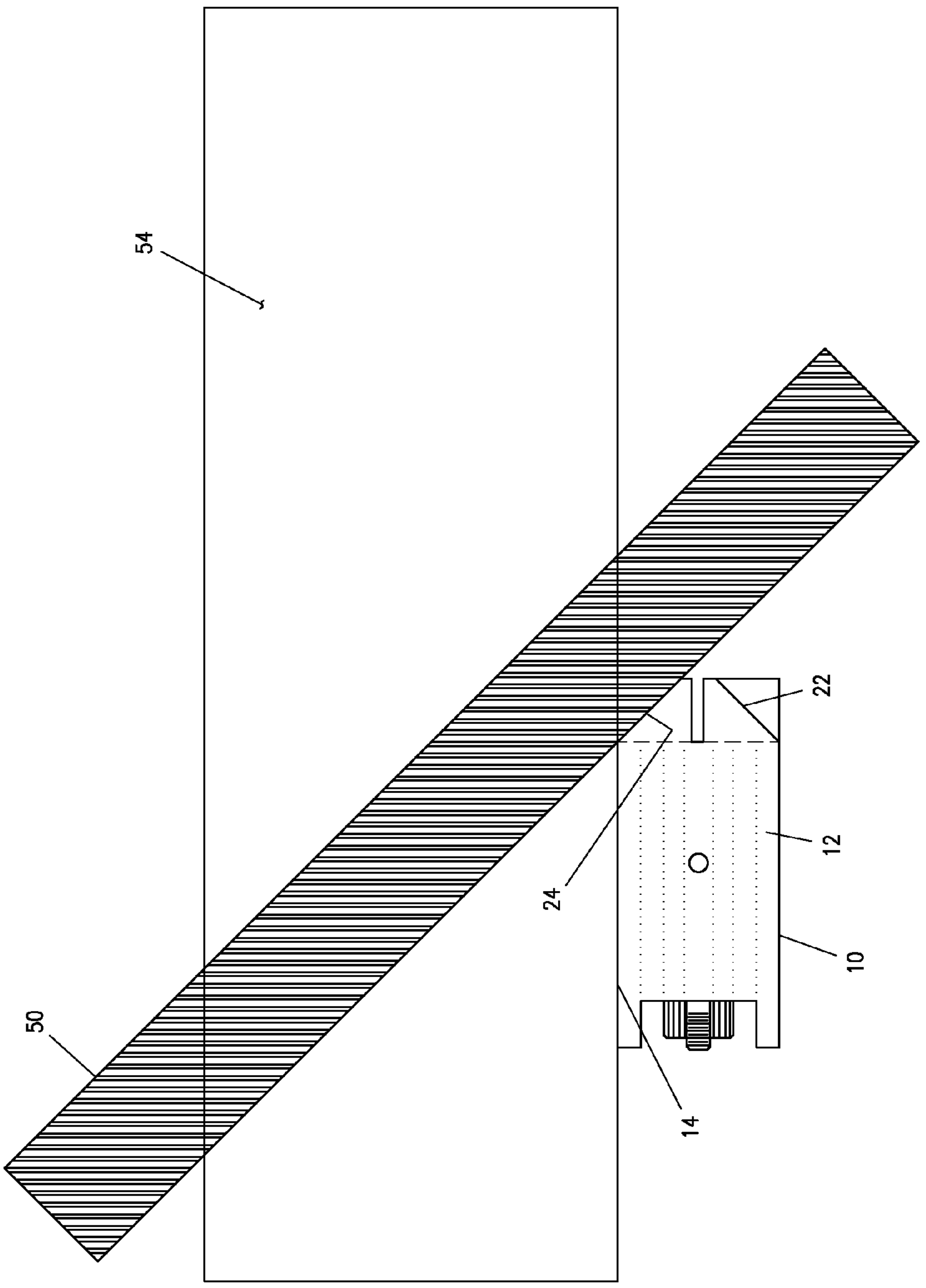
FIG. 8 is a plan view of the adjustable square device, shown using the angled portions of the front end of the inventive adjustable square device.

FIG. 8 shows a plan view of the adjustable square device 10 in combination with a pair of planar surfaces such as a flat bar 50 and a plate 54. In this embodiment, the device 10 can be used to ascertain a 45 degree angle between flat bar 50 and plate steel 54 by bringing the flat bar 50 into contact with angle portion 24 of the device 10, plate 54 flush into contact with the side 14 of the device 10. When used in this manner, the square device 10 may be used to ascertain a 45 degree angle with relationship to different bars or surfaces, such as flat bar 50 and steel plate 54 as shown. Although FIG. 8 shows the device 10 being used to establish an angled relationship without a blade, one may establish additional square relationships by inserting the blade into the either the first of the second groove. This type of orientation enables one to ascertain proper angles in not merely two dimensions (as shown in FIG. 8) but in three dimensions, too.

Figure 9A:
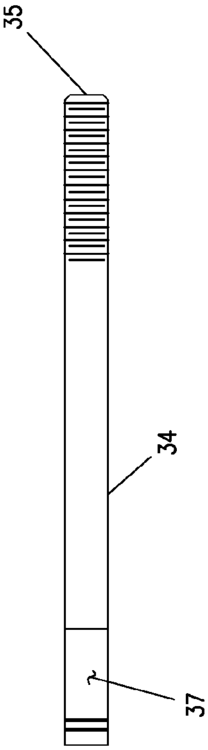
FIGS. 9A-9D are comparative views of the stem 34 that passes through the device
Figure 9B:
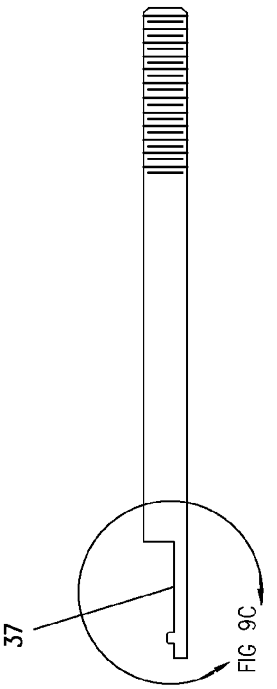
Figure 9D:
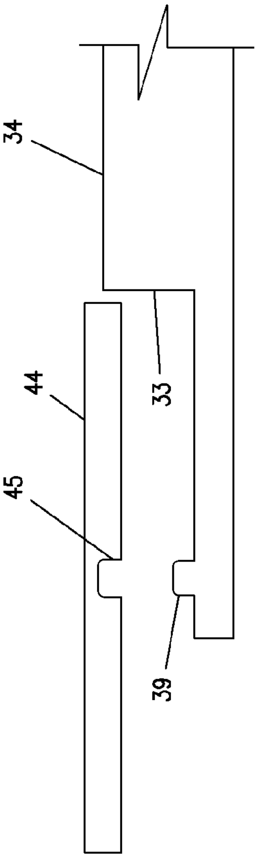
Figure 9C:
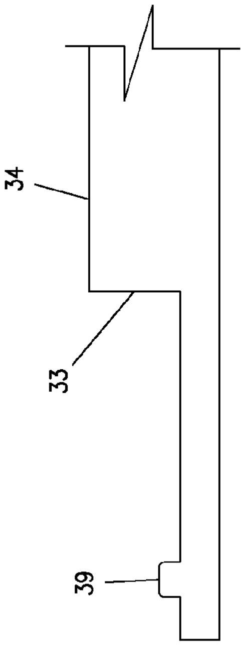

FIGS. 9A-9C are comparative views of the stem 34 that passes through the device 10. As shown in FIG. 9A, the stem 34 bears threading 35 at one end, and a chamfered portion 37 at its second end. Comparing FIG. 9A to FIG. 1, the threaded portion 35 of the stem 34 extends outwardly from a back end of the device, enabling one to tighten a nut onto the threaded portion 35.

FIG. 9B shows an alternate, side view of the stem 34, showing the relation of the chamfered portion 37 of the stem 34.

FIG. 9C shows a greater detail of the chamfered portion 37, as circled in FIG. 9B. A protuberance 39 extends upwardly from a flat area of the chamfered portion 37. The protuberance is formed to engage within a channel or groove formed on blade 44. When the stem 34 is inserted into the device 10 (supra), one tightens the nut to engage protuberance 39 within the groove on the blade 44, thereby securing the blade 44 to the device 10 in a selected position.

Although the invention and drawings are described in detail, this description has been made for illustrative and example purposes only. The scope and breadth of the described invention is limited only by the terms of patent claims that particularly point out and distinctly claim the metes and bounds of the invention.

The invention claimed is:

1. An adjustable square device comprising:

a body having a substantially uniform cross-section at planes orthogonal to a longitudinal axis, the cross-section having a generally rectangular outline;

a first groove extending inwardly from a first end of the body and oriented generally parallel a bottom surface of the body, the first groove oriented more proximate a top surface of the cross-section than the bottom surface;

a second groove extending inwardly from the first end and oriented orthogonal the first groove, the first and second grooves intersecting at a vertex;

a tunnel extending from the vertex to a second end of the body;

a blade slidably engagable into one of the first or second grooves;

a retaining stem positioned within the tunnel such that an initial end extends outside the body and a terminal end passes through the vertex to engage and retain the blade in a selected position; and, a rectangular void formed along the bottom surface of the body.

2. The adjustable square device as in claim 1, wherein the generally rectangular outline is square-shaped.

3. The adjustable square device as in claim 1, further comprising: a trapezoidal furrow extending inwardly from the rectangular void.

4. The adjustable square device as in claim 3, wherein the furrow and the void are each symmetric about a plane passing through the second groove.

5. The adjustable square device as in claim 1, further including:

a channel formed on the blade; and, a protuberance formed adjacent a terminal end of the retaining stem; wherein, the protuberance is formed to engage within the channel when the blade is positioned within one of the first or second grooves.

6. The adjustable square as in claim 1, further comprising: threading on the initial end of the retaining stem;

a nut engaging the threading; and wherein, the blade is securable to the body by tightening the nut on the retaining stem.

7. The adjustable square as in claim 1, wherein the first end of the body further includes a cut-out portion that is angled with respect to the second groove.

8. The adjustable square as in claim 7, wherein the angled portion is angled at forty-five degrees with respect to the second groove.

9. The adjustable square as in claim 7, further including a second cut out portion; wherein, the first and second cut out portions are symmetric about the second groove.

10. The adjustable square as in claim 1, further a means for frictionally engaging the stem removably inserted into a cavity formed in a body of the device.

11. The adjustable square as in claim 1, further comprising: threading on the initial end of the retaining stem;

a nut engaging the threading; and wherein, the blade is securable to the body by tightening the nut on the retaining stem.

12. An adjustable square device comprising:

a body having a substantially uniform cross-section at planes orthogonal to a longitudinal axis, the cross-section having a square-shaped outline;

a first groove extending inwardly from a first end of the body and oriented generally parallel a bottom surface of the body;

a second groove extending inwardly from the first end and oriented orthogonal the first groove, the first and second grooves intersecting at a vertex;

a tunnel extending from the vertex to a second end of the body;

a blade slidably engagable into one of the first or second grooves;

a retaining stem positioned within the tunnel such that an initial end extends outside the body and a terminal end passes through the vertex to engage and retain the blade in a selected position; and, a void of a generally uniform cross-section at planes orthogonal the longitudinal axis formed along the bottom surface of the body.

13. The adjustable square device as in claim 12 wherein the void is rectangular.

14. The adjustable square device as in claim 12, further comprising: a trapezoidal furrow extending inwardly from the void.

15. The adjustable square device as in claim 12, further including:

a channel formed on the blade; and, a protuberance formed adjacent a terminal end of the retaining stem; wherein, the protuberance is formed to engage within the channel when the blade is positioned within one of the first or second grooves.

16. The adjustable square as in claim 12, wherein the first end of the body further includes first and second angled portions that are symmetric about a vertical plane passing through the second groove.

17. A square device comprising:

a body having a substantially rectangular outline at planes orthogonal to a longitudinal axis;

a first groove extending inwardly from a first end of the body and oriented generally parallel a bottom surface of the body at a location more proximate an upper surface of the body than the bottom surface of the body;

a second groove extending inwardly from the first end and oriented orthogonal the first groove, the first and second grooves intersecting at a vertex;

a tunnel extending from the vertex to a second end of the body;

a first cut-out portion positioned at the first end and angled with respect to the second groove, and a second cut-out portion positioned at the first end and angled with respect to the second groove, the first and second cut-out portions being oriented symmetrically about the second groove;

a blade slidably engagable into one of the first or second grooves;

a retaining stem positioned within the tunnel such that an initial end extends outside the body and a terminal end passes through the vertex to engage and retain the blade in a selected position; and, a rectangular void formed along the bottom surface of the body;

a trapezoidal furrow extending inwardly from the rectangular void, the furrow and the void oriented symmetric about a plane passing through the second groove;

a channel formed on the blade;

a protuberance formed adjacent a terminal end of the retaining stem; threading on the initial end of the retaining stem;

a nut engaging the threading; wherein, the protuberance is formed to engage within the channel when the blade is positioned within one of the first or second grooves; and wherein, the blade is securable to the body by tightening the nut on the retaining stem.

* * * * *